000

United States Patent Office 3,695,835
Patented Oct. 3, 1972

3,695,835
AMMONIUM POLYPHOSPHATE MANUFACTURE
Tommy Carter Kearns, 5225 Clover Drive, Lisle, Ill. 60532, and Yang Joo Kim, 928 Sharon Drive, Addison, Ill. 60101
No Drawing. Filed May 6, 1970, Ser. No. 35,223
Int. Cl. C01b 25/28, 25/38
U.S. Cl. 423—310                8 Claims

ABSTRACT OF THE DISCLOSURE

A method is disclosed for forming ammonium polyphosphates having self-sequestering properties by quickly heating and converting a stream containing ammonium phosphate to ammonium polyphosphate. In one embodiment, ammonia and phosphoric acid are combined in a restricted reaction zone so as to form ammonium phosphates, steam and in some instances free ammonia, and are then subjected to hot gases so as to raise the temperature of the reaction mass to above about 450° F. whereby said ammonium phosphates are converted to ammonium polyphosphate.

---

This invention relates to a novel process for the production of ammonium polyphosphates having at least 20%, by weight, of its phosphate in the non-orthophosphate form. Generally, the product will have about 30%–90% of its $P_2O_5$ in non-ortho form; however, in most cases at least 60% conversion is preferred. The invention also concerns the production of liquid fertilizers which do not form gelatinous precipitates when stored for long periods of time. Granular fertilizer solids can also be produced and are included within the overall scope of the invention.

Several different methods have been employed in the past for manufacturing ammonium phosphates and polyphosphates. All the processes are related, to a certain extent, in that each method uses the reaction of phosphoric acid and ammonia. In this connection, wet process phosphoric acid is perhaps the cheapest source of phosphorus used in these processes and especially in the production of high analysis liquid and solid plant foods. In producing wet process phosphoric acid, phosphate rock containing various amounts of impurities is contacted with sulfuric acid.

In general, the phosphate rock contains relatively large amounts of iron, usually as iron oxide or as hydrates as well as aluminum oxide and other metal salts and oxides. Total impurities may comprise 10%–20% or more, by weight, of the rock with the iron oxide being in amounts up to roughly 3%. When the phosphate rock is digested with the sulfuric acid, the impurities, including iron and aluminum, occur in a finely divided form and readily go into solution. The relatively dilute phosphoric acid of about 28% to 33%, by weight, $P_2O_5$ concentration can contain approximately 90% to 95% of the iron originally present in the phosphate rock.

During the concentration of the relatively dilute, wet process phosphoric acid (28%–33% $P_2O_5$) to a commercial grade of 54% $P_2O_5$ acid most of the impurities in the acid end up in the concentrated acid in a supersaturated state and tend to precipitate upon aging. In prior art procedures, these impurities are eliminated from the concentrated phosphoric acid solution by various clarification means. However, iron and aluminum compounds generally remain in the phosphoric acid even after removal of the insoluble solids. These dissolved iron and aluminum ions as well as other impurities in concentrated phosphoric acid solutions are undesirable when one wishes to make aqueous solutions of water-soluble fertilizers prepared by the neutralization of phosphoric acid with alkaline reactants usually ammonia, ammonium hydroxide or potassium hydroxide. Precipitation of sludge-like impurities results during the neutralization of the acid, and these precipitates settle and clog the transfer and distribution equipment.

It has been proposed in the past to neutralize the wet process phosphoric acid in solution allowing the impurities to precipitate and then centrifuge and filter out the precipitate to obtain a clear solution. This is usually quite difficult and expensive because the precipitate is finely divided and gelatinous. This makes filtering almost impossible and also results in a loss of $P_2O_5$ values.

Recent advances in the art have used superphosphoric acid in the production of ammonium phosphates to obtain solutions being relatively free of gelatinous precipitates. Superphosphoric acid is usually made by evaporating 54% $P_2O_5$ wet process phosphoric acid to roughly 70%–72% $P_2O_5$. However, it is a premium chemical as large amounts of free and molecularly combined water must be removed from the regular orthophosphoric acid so as to produce an acid with a large portion of its phosphate in the pyro form. Further, superphosphoric acid in turn possesses several disadvantages when used to react with ammonia inasmuch as the reaction is quite exothermic and heat must be subtracted from the system. This is required inasmuch as the high temperatures will hydrolyze the desirable non-orthophosphate back to the orthophosphate form. In addition, it is quite important to feed the superphosphoric acid and ammonia at a very carefully controlled rate because low pH's will also accelerate the hydrolysis reaction.

Despite the various drawbacks of the use of superphosphoric acid, it has been described in various patents and literature articles as useful in making high analysis ammonium polyphosphates, i.e. from 10-34-0 up to 18-59-0. For example, U.S. Pat. No. 3,336,127 describes a process for making ammonium polyphosphate from superphosphoric acid or wet process acid which has been concentrated to 65%–75% $P_2O_5$. In the process of this patent, superphosphoric acid is fed into a reaction vessel along with anhydrous ammonia, and the two materials are reacted while being intimately and vigorously mixed with a motor-driven agitator. The reaction residence time is relatively long in that retention times of 1 to about 1½ hours are required.

In another patent is a description of a rapid method for producing ammonium polyphosphate which completely by-passes the expensive superphosphoric acid route generally used throughout the industry. This economically attractive method of producing ammonium polyphosphate is disclosed and claimed in U.S. Pat. No. 3,464,808 and comprises reacting wet process phosphoric acid with ammonia in a mixing T, called a "jet reactor." As disclosed in that patent, ammonia is passed to the jet reactor along with phosphoric acid which may be preheated if required. The heat of reaction quickly elevates the temperature of the ammonia-acid reaction mixture vaporizing the free water in the phosphoric acid to steam. The remaining exothermic reaction energy vaporizes the chemically combined water converting the orthophosphates into polyphosphates. Due to the high temperature inside the jet reactor, ammonia and phosphoric acid react only up to a mole ratio of slightly less than 1.0. Any excess unreacted ammonia and the superheated steam pass through the jet as vapor along with the molten ammonium polyphosphate. In one embodiment of that invention the reaction products from the reactor are generally discharged below an aqueous liquid level of the final product being manufactured and are immediately quenched by the water and neutralized. The steam contacts the cool liquid and condenses back to water. Any free ammonia reacts therewith and is absorbed by the liquid. The pH is generally controlled at about 6 to 6.6 by the overall ratio of the ammonia to phosphoric acid. The liquid aqueous solution temperature is controlled at less than 180° F. by use of a heat exchanger. The process is a decided advance in the art inasmuch as residence time in the reactor is very short, calculated to be less than 1 second, and therefore side reactions causing the formation of insoluble phopshates are non-existent.

However, when operating in accordance with the teachings of U.S. 3,464,808, a concentrated phosphoric acid of about 60%–62% $P_2O_5$ is required in order to obtain 60% or higher conversion, that is, more than 60% by weight of the total phosphates present in the product to be non-ortho. In order to use an acid of lower strength, i.e. 54% $P_2O_5$ acid, one has to preheat the acid somewhere between 400°–800° F. prior to contact with the ammonia. However, if one attempts to preheat the low strength acid (54% $P_2O_5$) by exposing it to hot combustion gases, a high level of conversion, i.e. 60%–80% is possible but severe corrosion of metal surfaces is encountered in the process due to the hot acid and high vapor pressure.

Accordingly, it is one object of this invention to produce ammonium polyphosphate from commercial 54% $P_2O_5$ wet process phosphoric acid in a single direct step with a very minimum amount of corrosion.

Another object of this invention is the production of ammonium polyphosphate having such a metal ion sequestering ability when dissolved in aqueous solutions that no gelatinous substances are formed when subsequent neutralization is carried out.

Another object of this invention is to provide a process for the production of ammonium polyphosphate wherein relatively dilute 30%–54% $P_2O_5$, phosphoric acid is simultaneously concentrated and reacted with ammonia.

Other objects, if not specifically set forth herein, will be readily apparent to those skilled in the art from the detailed description of the invention which follows.

Broadly, this invention relates to a novel method of producing ammonium polyphosphate in such a manner that a minimum of corrosion takes place. Generally, the final product will have about 30%–90% of its $P_2O_5$ content in the non-orthophosphate form. One embodiment of the invention comprises supplying, to a restricted reaction zone, liquid phosphoric acid and liquid or gaseous ammonia under pressure while reacting the ingredients at a temperature substantially below 450° F. but sufficient to produce molten or aqueous monoammonium phosphate (and possibly some diammonium phosphate) and steam. The ammonium phosphate is then immediately subjected to hot gases from direct or indirect sources so as to raise the temperature of the melt to between 450° F. and 800° F. (usually between 500° and 700° F. and preferably 550–600° F. or above) whereby the said ammonium phosphate is converted to ammonium polyphosphate. The ammonium polyphosphate is immediately processed by quenching in an aqueous solution or by other means followed by ammoniation of the solution to control the pH.

An alternative quenching procedure is to intermix the melt with cool fertilizer solids while spraying acid and ammonia onto the bed to produce a granular product. In either case it is preferred to proceed to cool the ammonium polyphosphate to a temperature below about 250° F. and usually below 180° F. immediately upon its exiting the reactor.

In carrying out the reaction, phosphoric acid and ammonia are reacted in a 2-fluid pipe reactor. The apparatus used may comprise an elongated reactor pipe having a diameter less than its length and generally uniform in cross section. Inlet tubes are provided at the inlet end for feeding ammonia and wet process acid into the pipe. The inlet tubes can be positioined in spaced-apart relationship to one another if desired or positioned concentrically, one within the other. When using gaseous ammonia, the inlet tube is merely an open end pipe but orifices can be provided, if desired, to obtain finer dissemination of reactant. When using liquid anhydrous ammonia it is necessary to provide rapid intimate mixing of the phosphoric acid and ammonia to prevent clogging of the reactor pipe. Also, the inlet tube can be provided with a plurality of spaced openings, i.e. a manifold arrangement.

A wide range of mixing T's are available, and the instant process can be carried out in a mixing T called a "jet reactor" such as disclosed in U.S. Patent No. 3,419,378 issued to T. C. Kearns, the disclosure of which is hereby incorporated by reference. For purposes of this invention, a mixing T is meant any restricted reaction zone so constructed that streams of ammonia and phosphoric acid are combined in vigorous motion and turbulent agitation. In one embodiment of the invention, vigorous centrifugal motion is imparted to the phosphoric acid prior to its contact with the ammonia stream. However, both streams may possess centrifugal or other forms of motion. Still another embodiment, using liquid anhydrous ammonia, comprises tangential entry, at high velocity, of the phosphoric acid into the annulus around an ammonia entry pipe.

Generally speaking, however, the crux of the instant invention is the conversion of ammonium phosphates, whether molten, solid or liquid into ammonium polyphosphate. In this connection, solid monoammonium phosphate, diammonium phosphate or mixtures thereof, can be fluidized and conveyed to the extremely hot gases for conversion to a high percent of non-ortho phosphate.

In the usual operation using 54% $P_2O_5$ acid, monoammonium phosphate is formed in the T reactor. It is possible, however, to form some diammonium phosphate especially if dilute acid is used. Accordingly, as used herein, the term ammonium phosphate means monoammonium phosphate, diammonium phosphate or mixtures thereof.

One embodiment of the invention comprises the steps of reacting ammonia and phosphoric acid under pressure in a restricted mixing T while carefully controlling the moisture content and temperature to produce an intimate mixture of monoammonium phosphate, steam and sometimes free ammonia having a temperature between about 220° F. and about 450° F., usually about 300°–450° F. as it emerges from the reactor. This relatively mild reaction causes no serious corrosion problems to the reactor nozzle or other adjacent parts. However, in order to get at least 60% conversion, the monoammonium phosphate is subjected to hot gases having temperatures sufficient to raise the temperature of the reaction mass to between about 450° F. and 800° F. The reaction mass at this higher temperature is maintained in this state for a period of time sufficient to convert the ortho-phosphate content thereof, by condensation, to polyphosphates of the desired percentage. The overall reaction time is a few seconds, generally less than 5 seconds. The molten ammonium polyphosphate is then quenched, usually to a temperature below about 200° F. and preferably below a 160° F. with subsequent cooling to preferably below 90° F. to retard reversion in storage.

More in detail in regard to the production of the monoammonium phosphate prior to contact with the hot gases, gaseous ammonia under 10–15 p.s.i.g. can be reacted with liquid phosphoric acid itself usually being under a pressure of at least 10–15 p.s.i.g. At the point of contact in the mixing T, the phosphoric acid reacts rapidly with the gaseous ammonia to form ammonium phosphate suspended in a stream of superheated steam and, depending upon the mole ratio of ammonia to acid, free ammonia. This, along with the short residence time, prevents the precipitation of iron metaphosphate and other insoluble phosphates. As the monoammonium phosphate, along with the superheated stream, leaves the restricted reaction zone, it comes in contact with hot combustion gases with the evaporation of the water and conversion to a high percentage of non-orthophosphate. If the mole ratio of ammonia to acid is less than 0.8, the ammonia reaction is complete while a mole ratio above 0.8 results in unreacted ammonia exiting along with the product. This unreacted ammonia is not necessarily objectionable since it can be used to further neutralize the ammonium polyphosphate to a ratio of about 1:3 of N to $P_2O_5$.

It is important to control the amount of water in the phosphoric acid at the time it contacts the ammonia inasmuch as too much water results in excess energy requirements required to drive off the water. In general, the phosphoric acid is controlled so that it contains between about 30%–56%, by weight, $P_2O_5$ and preferably about 52%–56%, by weight $P_2O_5$ when in contact with the ammonia. Diluted acids may be used and concentrated prior to the actual contact with the ammonia. Accordingly, phosphoric acids of $P_2O_5$ content theoretically ranging from 0 to roughly 56% $P_2O_5$ may be used. When using dilute acids, however, the $P_2O_5$ content normally will be at least 30%. For example, one may use phosphoric acid sludge resulting from the precipitation and settling of insoluble materials naturally occurring in wet-process phopshoric acid. These impurities consist of iron phosphates, iron potassium phosphates, aluminum phosphates, silica fluorides, organic matter, etc. However, it should be noted that iron phosphates themselves are plant nutrients. When using the acid sludge, it will normally analyze roughly 38%–56% $P_2O_5$ with about 5% to 20% insoluble solids.

Conversion of the ammonium phosphate to ammonium polyphosphate is accomplished by supplying additional energy requirements to molecularly dehydrate the orthophosphoric acid, i.e. convert the orthophosphates to non-orthophosphates. This is usually accomplished by subjecting the ammonium phosphate to hot combustion gases having a temperature of 600° F. to 3800° F. so as to heat the melt to a temperature of at least 450° F. and preferably above 550° F.

The molten mixture of ammoniated, highly condensed phosphates is quite difficult to handle and should be processed immediately before it cools into a glassy hygroscopic mass. The quenching may be carried out in several ways such as the use of a trajectory of the melt through air so as to let the steam escape in flight. Normally, the melt is then dissolved in an aqueous solution and neutralized with additional ammonia. This has a slight advantage in that the aqueous solution is not generally heated by the condensation of the steam. A more preferred method is to quench the melt by submerging the end of the jet reactor below a liquid level in an aqueous solution tank. In such a method the melt does not fly through space and hence the steam, ammonia and other gases do not escape. This has the decided advantage that only small amounts of fumes are produced. In addition, the entire flow of ammonia required in the final ammonium phosphate solution can be added via the jet reactor because any unreacted ammonia in the jet is recondensed with the steam in the aqueous solution. It is important that the pH of the solution be controlled by the rate of the ammonia fed to the jet. The overall pH should range between about 5.0 and 8.0 usually between 6.0 and 6.6.

Still another method for quenching the molten ammonium polyphosphate is to transfer the melt to a bed of solids if a granular product is contemplated. By using an already formed, solid, ammonium phosphate mixture as a rolling bed of solids, the hot melt can be sprayed onto the solids using part of the product as recycle. The system can be positioned such that the ammonia lost in the jet reactor will be substantially absorbed in the relatively cool rolling bed of solids.

In order for the ammonium polyphosphate from wet process phosphoric acid to be self-sequestering, there must be a conversion of at least 20%, by weight, of the phosphates to the non-ortho form. However, it is usually preferred that at least 60% of the phosphates be in the non-ortho form. This extra conversion enables more leeway in producing high analysis liquid products where extra wet process phosphoric acid is used in making other formulations.

The specific examples that follow are for illustrative purposes only and are not to be construed as imposing limitations on the scope of the invention other than are set forth in the appended claims.

EXAMPLE I

The pilot plant apparatus employed to carry out this example consisted of 2 pipes, connected by a ½″ T, to supply ammonia and phosphoric acid which react to form ammonium phosphate. Wet process phosphoric acid having a $P_2O_5$ content of 54% and a temperature of about 60° F. was supplied continuously to the ammonium phosphate mixing T at a rate of 296 lbs. per hour, under 15 p.s.i.g. pressure. Gaseous ammonia (60° F.) at a rate of about 60 lbs./hr., and under 15 p.s.i.g. was simultaneously supplied to the mixing T to be reacted with the phosphoric acid. The reaction product, which consisted of molten droplets of ammonium phosphates and a high velocity stream of superheated steam, was then sprayed directly into a stream of hot combustion gases having a temperature of about 3000° to 3800° F. The temperature of the molten droplets of ammonium phosphate was raised from about 260° F., as it emerged from the mixing T, to approximately 650° F. while traveling through a combustion chamber-reactor extension, elbow, and a mixer extension and while suspended in the hot combustion gases. The hot melt was subsequently quenched in a cold diluted solution of ammonium polyphosphate in a fluid mix tank to continuously produce 400 lbs./hr. liquid ammonium polyphosphate of 10.75–36.64–0 with approximately 82.3% of its $P_2O_5$ in non-ortho form. The ammonium polyphosphate solution in the fluid mix tank was kept at about 140° F. by external cooling. The average residence time of the ammonium phosphate in direct contact with the hot combustion gases was approximately one-twentieth of one second. Approximately 60 lbs./hr. of process water, 6 lbs./hr. of liquid propane gas having a molar ratio of 60% propane and 40% isobutane, and about 95 lbs./hr. of compressed air were required to maintain the recorded production rate. The pressure of air and LP gas at the burner premixer was both at 15 p.s.i.g. The final product had a specific gravity of 1.50 at 60° F. and a pH of 6.5.

EXAMPLE II

The pilot plant apparatus was operated in the same manner as that in Example I, except that the final temperature of the ammonium polyphosphate melt stream was maintained at about 575° F. by reducing the LP gas feed rate slightly, i.e. about 5.8 lbs. per hour and reducing the process water rate to 50 lbs./hr. The final product analyzed 12.79–40.50–0 with approximately 64% of the $P_2O_5$ in non-ortho form. The product had a specific gravity of 1.51 and a pH of 6.6 at about 60° F.

EXAMPLE III

A commercial scale production unit for the direct energy, conversion process having a production capacity of 6 tons per hour, liquid ammonium polyphosphate, 12–40–0, from 54% $P_2O_5$ wet process phosphoric acid and anhydrous ammonia using a 3½ million B.t.u. per hour natural gas burner was utilized. The unit is essentially the same as that of the pilot unit, but the method of mixing the molten ammonium phosphate stream with the hot combustion gases was modified to allow a tangential input of the molten ammonium phosphate into the main hot gas stream at a cone shaped stainless steel mixer located immediately under the natural gas burner. The ammonium phosphate mixing T including its piping were sized so as to give a residence time of less than one second. 10,008 lbs. per hour, wet process phosphoric acid having a $P_2O_5$ concentration of 54% and 1,968 lbs. per hour anhydrous ammonia were simultaneously fed to the ammonium phosphate mixing T. The reaction product, molten ammonium phosphate, was then subjected to a hot combustion gas stream of 3000° to 3800° F. so as to increase the temperature of the molten ammonium phosphate from about 260° F., as it emerges from the mixing T, to approximately 610° F. The hot, polyphosphate melt was then discharged immediately into a fluid mix tank containing a cold, ammonium polyphosphate solution thereby producing about 8 tons per hour 10.21–34.80–0 solution containing about 61.5% of its $P_2O_5$ in non-ortho form. About 4,270 lbs. per hour of process water, 45 standard cubic feet per minute of natural gas and about 470 s.c.f.m. of compressed air under 18 p.s.i.g. were required to maintain the recorded production rate. The final product had a pH of 6.5 and a specific gravity of 1.417 at about 60° F.

Obviously many modifications and variations of the invention as hereinbefore set forth may be made without departing from the spirit and scope thereof, and, therefore, only such limitations should be imposed as are indicated in the appended claims.

We claim:

1. A process for preparing ammonium polyphosphates having self-sequestering properties and having a non-ortho phosphate of at least 60% with a minimum amount of corrosion taking place on the metal surfaces of the reactor which comprises supplying ammonia and wet process phosphoric acid having a $P_2O_5$ content of between about 30% and about 56% to a restricted reaction zone, reacting said ammonia and phosphoric acid in said reaction zone at a temperature between about 220° F. and about 450° F. to form molten ammonium phosphate, immediately heating said molten ammonium phosphate by contacting it with combustion gases at a temperature between about 600° F. and 3800° F. so as to raise the temperature of the ammonium phosphate to between about 550° F. and about 800° F. whereby the said ammonium phosphate is converted to ammonium polyphosphates and immediately thereafter quenching the ammonium polyphosphate to a temperature below about 250° F.

2. The process of claim 1 wherein the overall reaction time is less than five seconds.

3. The process of claim 1 wherein the ammonia and phosphoric acid react to form molten droplets of ammonium polyphosphate suspended in superheated steam and the hot gases are combustion products of the direct oxidation of fuel with air.

4. The process of claim 1 wherein vigorous centrifugal motion is imparted to the ammonium phosphate as it comes in contact with the hot gases.

5. The method of claim 1 wherein the ammonium polyphosphate is quenched to a temperature below about 180° F.

6. The process of claim 1 wherein the quenching is accomplished by impelling the ammonium polyphosphate through space and dissolving it in an aqueous solution.

7. The method of claim 1 wherein the ammonium polyphosphate is quenched in an aqueous solution while neutralizing the product to a pH range between about 5 and about 8 by adding ammonia.

8. The process of claim 1 wherein the quenching is accomplished by contacting the ammonium polyphosphate with relatively cool fertilizer solids.

References Cited
UNITED STATES PATENTS

| | | | |
|---|---|---|---|
| 3,492,087 | 1/1970 | MacGregor et al. | 23—107 |
| 3,423,173 | 1/1969 | McFarlin et al. | 23—165 |
| 3,382,059 | 5/1968 | Getsinger | 71—34 |
| 3,464,808 | 9/1969 | Kearns | 71—34 |
| 3,419,378 | 12/1968 | Kearns | 71—34 |
| 3,562,768 | 2/1971 | Edquist et al. | 23—107 |

EARL C. THOMAS, Primary Examiner

G. A. HELLER, Assistant Examiner

U.S. Cl. X.R.

71—34, 43